US009171692B2

(12) United States Patent  
Baral et al.

(10) Patent No.: US 9,171,692 B2
(45) Date of Patent: Oct. 27, 2015

(54) DRIVE FOR ROTARY ANODE WITH STATOR WITH YOKE WINDING

(75) Inventors: Andreas Baral, Kassel (DE); Andreas Rohrmoser, Kassel (DE); Carsten Voss, Heroldsbach (DE); Thomas Weidinger, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 216 days.

(21) Appl. No.: 13/588,842

(22) Filed: Aug. 17, 2012

(65) Prior Publication Data

US 2013/0208871 A1    Aug. 15, 2013

(30) Foreign Application Priority Data

Aug. 19, 2011    (DE) .................. 10 2011 081 280

(51) Int. Cl.
| | |
|---|---|
| H01J 35/10 | (2006.01) |
| H02K 1/14 | (2006.01) |
| H02K 1/08 | (2006.01) |
| H02K 1/16 | (2006.01) |

(52) U.S. Cl.
CPC .............. H01J 35/101 (2013.01); H02K 1/148 (2013.01); H01J 35/10 (2013.01); H01J 2235/104 (2013.01); H02K 1/08 (2013.01); H02K 1/146 (2013.01); H02K 1/16 (2013.01); H02K 2213/03 (2013.01)

(58) Field of Classification Search
CPC ....... H01J 35/10; H01J 35/101; H01J 35/103; H01J 35/26; H01J 2235/1026; H01J 2235/1033; H01J 1/44; H01J 2235/104; H02K 1/148; H02K 2213/03; Y10T 29/49009
USPC .......................................... 378/131, 135, 136
See application file for complete search history.

(56) References Cited

U.S. PATENT DOCUMENTS

| | | | | |
|---|---|---|---|---|
| 382,279 A | * | 5/1888 | Tesla, N. ....................... | 318/727 |
| 1,957,380 A | * | 5/1934 | Barlow ................ | 310/216.086 |
| 4,500,142 A | * | 2/1985 | Brunet ......................... | 310/90.5 |
| 5,077,781 A | * | 12/1991 | Iversen ......................... | 378/200 |

(Continued)

FOREIGN PATENT DOCUMENTS

| | | | | |
|---|---|---|---|---|
| CN | 101461120 A | | 6/2009 | |
| DE | 102010028509 | * | 7/2011 | ............... H02K 1/14 |

OTHER PUBLICATIONS

Nakamura et al, Stator Design of a Multi-Consequent-pole Bearingless Motor with Toroidal Winding, Sep. 2009, IEEE Energy Conversion Congress and Exposition, p. 2404.*
German Office Action dated Jan. 5, 2012 for corresponding German Patent Application No. DE 10 2011 081 280.6 with English translation.

(Continued)

Primary Examiner — David J Makiya
Assistant Examiner — Julio M Duarte-Carvajalino
(74) Attorney, Agent, or Firm — Lempia Summerfield Katz LLC

(57) ABSTRACT

An x-ray arrangement includes a vacuum container in, which a rotary anode and a rotor of an electrical machine are disposed. The rotary anode and the rotor have a torque-proof connection to one another and are rotatably supported in the vacuum container, so that the rotary anode and the rotor are rotatable around an axis of rotation. Viewed in a direction of the axis of rotation, a laminated stator core is disposed in an area of the rotor. The area of the rotor, in relation to the axis of rotation, surrounds the vacuum container radially outwards. A stator winding system is disposed in the laminated stator core. The stator winding system has windings embodied as a yoke winding.

12 Claims, 3 Drawing Sheets

(56) References Cited

U.S. PATENT DOCUMENTS

| | | | |
|---|---|---|---|
| 5,778,512 A * | 7/1998 | Ichikawa et al. | 29/598 |
| 2003/0001450 A1* | 1/2003 | Kazmierczak | 310/184 |
| 2009/0026873 A1* | 1/2009 | Matsuo et al. | 310/216 |
| 2010/0033043 A1 | 2/2010 | Seki et al. | |
| 2010/0244603 A1* | 9/2010 | El-Refaie et al. | 310/152 |
| 2011/0163629 A1* | 7/2011 | Seki et al. | 310/257 |

OTHER PUBLICATIONS

M. Lindegger, "Funktionsmuster Eines Integral-Sparmotors IM Leistungsbereich Kleiner 1KW," Circle Motor AG, Eidgenössisches Department für Umwelt, Verkehr, Energie und Kommunikation UVEK, pp. 1-25. Nov. 30, 2006.

Chinese Office action for related Chinese Application No. 201210487455.1, dated Aug. 5, 2015.

* cited by examiner

DRIVE FOR ROTARY ANODE WITH STATOR WITH YOKE WINDING

This application claims the benefit of DE 10 2011 081 280.6, filed on Aug. 19, 2011.

BACKGROUND

The present embodiments relate to an x-ray arrangement.

An x-ray arrangement is known, for example, from U.S. Pat. No. 4,500,142.

In electrical drives of all types, an air gap between a stator and a rotor may be dimensioned as small as possible, since, in this way, the magnetic effect of the stator on the rotor is maximized. In a drive for the rotary anode of an x-ray arrangement, however, a relatively large air gap is to be taken into consideration, since the rotor is located together with the rotary anode within the vacuum container. The stator is disposed outside the vacuum container. When the rotor is at high voltage potential, an even greater distance is to be maintained in order to provide a corresponding electrical isolation. Therefore, a drive for a rotary anode of an x-ray arrangement, compared to a standard drive, has a relatively small power density. In addition, the space provided for the stator is often limited, so that the stator may not be made any larger.

SUMMARY AND DESCRIPTION

The present embodiments may obviate one or more of the drawbacks or limitations in the related art. For example, an x-ray arrangement, in which the space for housing the stator is utilized in the optimum manner, is provided.

In one embodiment, an x-ray arrangement includes a laminated stator core that includes grooves open radially inwards. Turns of windings of the laminated stator core each run in one of the grooves from a first axial end of the laminated stator core to a second axial end of the laminated stator core, radially outwards, on an outer side of the laminated stator core back to the first axial end of the laminated stator core, and radially inwards again to the corresponding groove.

This embodiment enables the space required for the winding heads of the stator winding system to be greatly reduced, so that, with the effect remaining the same, the stator may be configured to be more compact, or, with the size remaining the same, the torque exerted by the stator on the rotor may be increased.

In one embodiment, the laminated stator core may be divided into segments in a cross-sectional plane orthogonal to the axis of rotation. A yoke winding may be disposed on each of the segments. In a simple way, the yoke windings may be accommodated on the laminated stator core. For example, the yoke windings may be wound onto plastic formers beforehand, so that the plastic formers including the corresponding yoke windings only have to be placed onto the segments. The division of the laminated stator core into segments may also be provided for other drives (e.g., regardless of whether the drive is used in an x-ray arrangement or not).

In one embodiment, the segments are embodied such that boundary surfaces, at which immediately adjoining segments adjoin each other, intersect a radial beam at an intersection point, there dividing the respective boundary surface centrally in the cross-sectional plane making an angle with the radial beam. This embodiment enables magnetic losses to be minimized. This embodiment, like the division of the laminated stator cores into segments, is independent of the application.

In one embodiment, at least a few of the segments in the transitional area from one yoke winding to the next yoke winding may have a tooth pointing radially outwards. Depending on the location of the individual case, all segments may have such a tooth. As an alternative, none of the segments in the transitional area from one yoke winding to the next yoke winding have a tooth pointing radially outwards.

The drive of the rotary anode is embodied as an electrical asynchronous machine. In one embodiment, the rotor interacts with the laminated stator core and the stator winding system as a type of electrical asynchronous machine. For example, the rotor may be embodied as a commutator for this purpose. The commutator may have a radially outer copper layer and a radially inner steel layer in relation to the axis of rotation.

The yoke windings may be embodied as required. For example, the yoke windings may be wound from RF stranded cables.

DETAILED DESCRIPTION OF THE DRAWINGS

Figure 1:
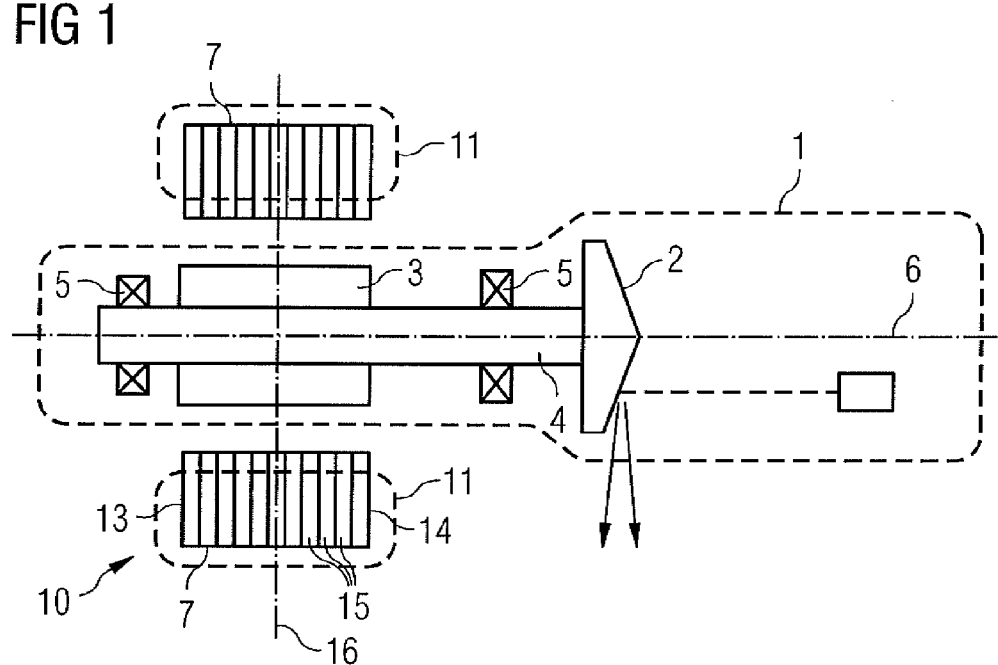
FIG. 1 shows one embodiment of an x-ray arrangement in longitudinal section.

According to FIG. 1 an x-ray arrangement includes a vacuum container 1. Disposed in the vacuum container 1 are, for example, a rotary anode 2 and a rotor 3 of an electrical machine. The rotary anode 2 and the rotor 3 are disposed in a torque-proof manner on a common shaft 4 and therefore have a torque-proof connection to one another. The shaft 4 is rotatably supported in bearings 5 so that the rotary anode 2 and the rotor 3 are rotatable around an axis of rotation 6.

Where the terms "axial," "radial" and "tangential" are used below, the terms are related to the axis of rotation 6. "Axial" is a direction in parallel to the axis of rotation 6. "Radial" is a direction orthogonal to the axis of rotation 6 on the axis of rotation 6 towards the axis of rotation 6 or away from the axis of rotation 6. "Tangential" is a direction that is orthogonal to both the axial direction and also to the radial direction. "Tangential" is thus a direction that is aligned at a constant radial distance around the axis of rotation 6.

To drive the rotor 3, a laminated stator core 7 is, (e.g., seen in the direction of the axis of rotation 6), disposed in an area of the rotor 3. The laminated stator core 7 surrounds the rotor 3 radially outwards in relation to the axis of rotation 6. The laminated stator core 7 (see FIGS. 2 and 3) has a number of teeth 8 facing inwards (e.g., radially inwards) on an inner periphery. A groove 9 of the laminated stator core 7 is located between every two teeth 8.

Figure 3:
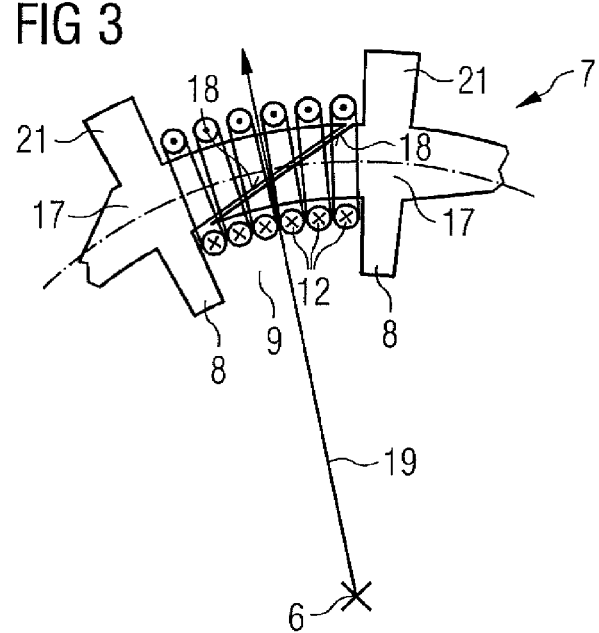
FIG. 3 shows a section of the laminated stator core from FIG. 2 with a winding.
Figure 4:
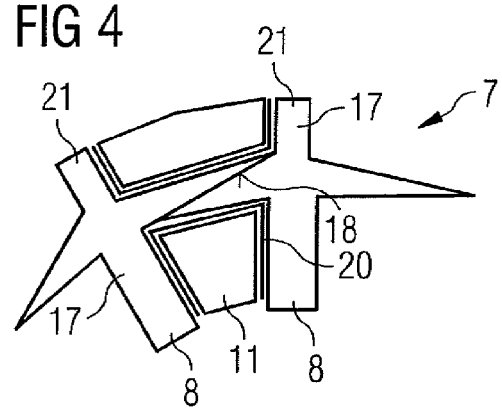
FIG. 4 shows one embodiment of the laminated stator core of FIG. 3.

Disposed in the laminated stator core 7 is a stator winding system 10 that has windings 11. Each of the windings 11 is laid into one of the grooves 9 of the laminated stator core 7. FIG. 3 shows, as a representation of all windings 11, one of the windings 11 of the stator winding system 10.

According to FIG. 3, the windings 11 are embodied as yoke windings 11 (e.g., individual turns 12 of the corresponding winding 11 run in one of the grooves 9 from a first axial end 13 of the laminated stator core 7 (see FIG. 1) to a second axial end 14 of the laminated stator core 7 (see FIG. 1), radially outwards, on the outside (i.e., radially outwards) back to the first axial end 13 of the laminated stator core 7, and radially inwards again to the corresponding groove 9).

In one embodiment, the laminated stator core 7 includes laminated stator sheets 15 in accordance with the usual procedure. The laminated stator sheets 15 are embodied in one piece and, viewed in the axial direction, are stacked on one another, so that the laminated stator core 7 is a single block after the laminated stator sheets 15 are joined together. The laminated stator core 7 may be wound, for example, using a normal ring core winding machine. In one embodiment, the laminated stator core 7 is divided into segments 17 in accordance with the diagram of FIGS. 2 and 3 in a cross-sectional plane 16 orthogonal to the axis of rotation 6. For example, the number of segments may match the number of teeth 8 pointing inwards, so that a yoke winding 11 is disposed on each of the segments 17.

Boundary surfaces 18 of the segments 17, at which the segments 17 adjoin each other, may lie in axial planes (e.g., in planes that include the axis of rotation 6). In one embodiment, the segments 17 are embodied in accordance with FIGS. 2 and 3, such that the boundary surfaces 18 make an angle a with a respective central radial beam 19. The respective central radial beam 19 is a beam that originates from the axis of rotation 6, runs orthogonally to the axis of rotation 6 in the cross-sectional plane 16 and divides the respective boundary surface 18 in the center. In one embodiment, the angle α may be as close to 90° as is possible in terms of construction. In practice, the result is that the angle a mostly lies between 60° and 75°. A minimum of 45° should not be undershot.

In accordance with the diagram shown in FIG. 3, the respective yoke winding 11 may be wound directly onto the corresponding segment 17. As an alternative, the corresponding yoke winding 11 may be wound in advance onto a winding carrier 20 that is placed together with the corresponding yoke winding 11 onto the corresponding segment 17.

Figure 2:
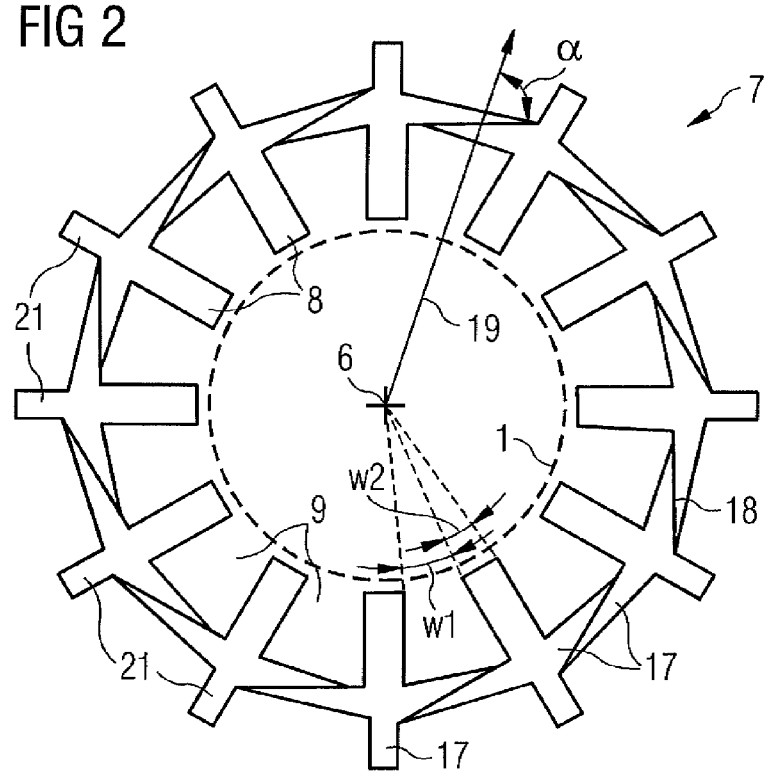
FIG. 2 shows one embodiment of a laminated stator core of the x-ray arrangement from FIG. 1 in cross section.
Figure 5:
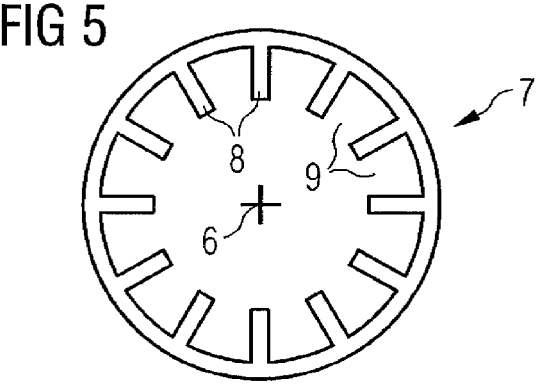
FIGS. 5 to 7 show possible embodiments of the laminated stator core from FIG. 2 in cross section.
Figure 6:
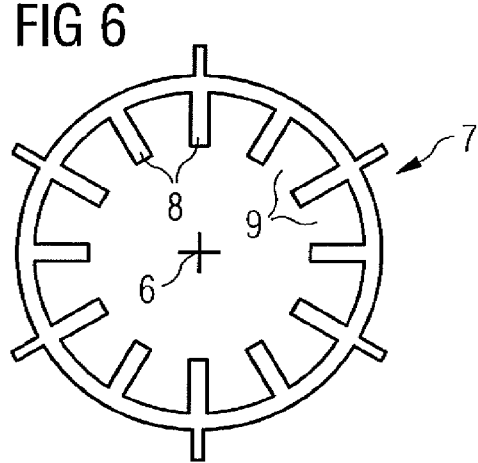
Figure 7:
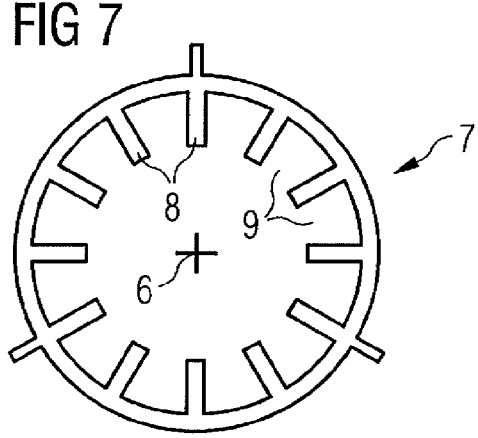

In accordance with the diagram shown in FIGS. 2 and 3, all segments 17 in a transition area from one yoke winding 11 to the next yoke winding 11 have a tooth 21 pointing radially outwards. As an alternative, in accordance with the diagram shown in FIG. 5, none of the segments have the teeth 21 pointing radially outwards. In accordance with the embodiments shown in FIGS. 6 and 7, some but not all segments 17 in the transition area from one yoke winding 11 to the next yoke winding 11 have the tooth 21 pointing radially outwards.

Figure 8:
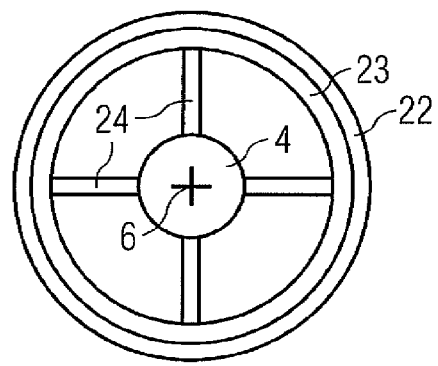
FIG. 8 shows one embodiment of a rotor of the x-ray arrangement from FIG. 1 in cross section.

The rotor 3 may interact with the laminated stator core 7 and the stator winding system 10 like a type of electric asynchronous machine. For example, the rotor 3 may be embodied for this purpose in accordance with FIG. 8 as a commutator that, in relation to the axis of rotation 6, has a radially outer copper layer 22 and a radially inner steel layer 23. A carrier structure 24 that connects the rotor 3 to the shafts 4 in a torque-proof manner may be embodied as required.

The material used for manufacturing the windings 11 may be selected as required. In one embodiment, the yoke windings 11 are wound in accordance with the diagram in FIG. 3 from RF stranded cables (e.g., from a stranded cable, in which the individual wires are electrically isolated from one another). As an alternative, a winding may, for example, be manufactured from solid wire, copper lacquered wire, parallel wires, or another type of wire.

The present embodiments have many advantages. For example, a higher power density is produced. The higher power density makes a more compact construction than in the prior art and thereby a higher torque for the rotary anode 2 possible. A groove width w1 and a tooth width w2 may be better matched to one another. For example, the groove width w1 and the tooth width w2 may be defined such that the magnetic flux in the teeth 8 pointing radially inwards and in the yoke approaches magnetic saturation, and thereby, the power density is optimized in this area. The yoke thickness may also be varied within the meaning of such an optimization. Because of the smaller winding heads, the axial length of the laminated stator core 7, with the overall dimensions of the stator remaining unchanged, may also be increased. Torque transferred to the rotor 3 may thus be increased even further.

Although the invention has been illustrated and described in greater detail by the exemplary embodiments, the invention is not restricted by the disclosed examples. Other variations may be derived therefrom by the person skilled in the art without departing from the scope of protection of the invention.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An x-ray arrangement comprising:
   a vacuum container;
   a rotary anode and a rotor of an electrical machine disposed in the vacuum container, wherein the rotary anode and the rotor have a torque-proof connection to one another and are rotatably supported in the vacuum container, so that the rotary anode and the rotor are rotatable around an axis of rotation;
   a laminated stator core of the electrical machine, which, viewed in a direction of the axis of rotation, is disposed in an area of the rotor and encloses the vacuum container radially outwards; and
   a stator winding system disposed in the laminated stator core, the stator winding system comprising yoke windings, wherein turns of the yoke windings run in grooves from a first axial end of the laminated stator core to a second axial end of the laminated stator core radially outwards, on an outer side of the laminated stator core, back to the first axial end of the laminated stator core, and radially inwards to the corresponding groove,
   wherein the laminated stator core is divided into segments in a cross sectional plane orthogonal to the axis of rotation, each segment comprising a pair of teeth, a first tooth of the pair pointing radially inward and a second tooth of the pair pointing radially outward, opposite the first tooth, and wherein a yoke winding is disposed on each segment of the laminated stator core and positioned between adjacent pairs of teeth,
   wherein the segments are configured such that boundary surfaces intersect a radial beam at an intersection point, therein dividing the respective boundary surface centrally in the cross-sectional plane and providing an angle greater than 0° as measured between the radial beam extending outward from the axis of rotation and the boundary surface extending toward the outer side of the laminated stator core, wherein each boundary surface is provided between immediately adjoining segments that adjoin each other along a plane extending between a first adjoining segment at the inner side of the laminated stator core at the radially inward pointing tooth of the first adjoining segment and a second adjoining segment at the outer side of the laminated stator core at the radially outward pointing tooth of the second adjoining segment.

2. The x-ray arrangement as claimed in claim 1, wherein the rotor is operable to interact with the laminated stator core and the stator winding system as a type of electrical asynchronous machine.

3. The x-ray arrangement as claimed in claim 2, wherein the rotor is configured as a commutator that, in relation to the axis of rotation, has a radially outer copper layer and a radially inner steel layer.

4. The x-ray arrangement as claimed in claim 2, wherein the angle is between 45° and 90°.

5. The x-ray arrangement as claimed in claim 2, wherein the angle is between 60° and 75°.

6. The x-ray arrangement as claimed in claim 1, wherein the yoke windings are wound from RF stranded cable.

7. The x-ray arrangement as claimed in claim 6, wherein the angle is between 60° and 75°.

8. The x-ray arrangement as claimed in claim 3, wherein the angle is between 45° and 90°.

9. The x-ray arrangement as claimed in claim 3, wherein the angle is between 60° and 75°.

10. The x-ray arrangement as claimed in claim 6, wherein the angle is between 45° and 90°.

11. The x-ray arrangement as claimed in claim 1, wherein the angle is between 45° and 90°.

12. The x-ray arrangement as claimed in claim 1, wherein the angle is between 60° and 75°.

* * * * *